United States Patent [19]

Davis

[11] 4,090,780

[45] May 23, 1978

[54] LINEAR OBJECTIVE ADJUSTMENT DEVICE FOR RIFLE SCOPE COLLIMATION

[75] Inventor: Larry D. Davis, Denver, Colo.

[73] Assignee: Outdoor Sports Inc., Denver, Colo.

[21] Appl. No.: 742,095

[22] Filed: Nov. 16, 1976

[51] Int. Cl.² .................................................. G02B 7/02
[52] U.S. Cl. ..................................................... 350/255
[58] Field of Search ............... 350/255, 252, 257, 187, 350/186, 184, 46, 10

[56] References Cited

U.S. PATENT DOCUMENTS

| | | | |
|---|---|---|---|
| 2,784,644 | 3/1957 | Bednarz | 350/184 |
| 3,183,813 | 5/1965 | Wöhner et al. | 350/255 |

*Primary Examiner*—Jon W. Henry
*Attorney, Agent, or Firm*—Sheridan, Ross, Fields & McIntosh

[57] ABSTRACT

A linear objective adjustment device is provided in a rifle scope for collimation and is particularly adaptable to scopes wherein the objective end is of noncircular configuration. A lens mount containing a lens system is slidable longitudinally within the objective end of the outer housing of the scope to adjust the back focal position of the objective lens system to coincide with the focal point of the remaining lens system and then is locked in adjusted position.

8 Claims, 8 Drawing Figures

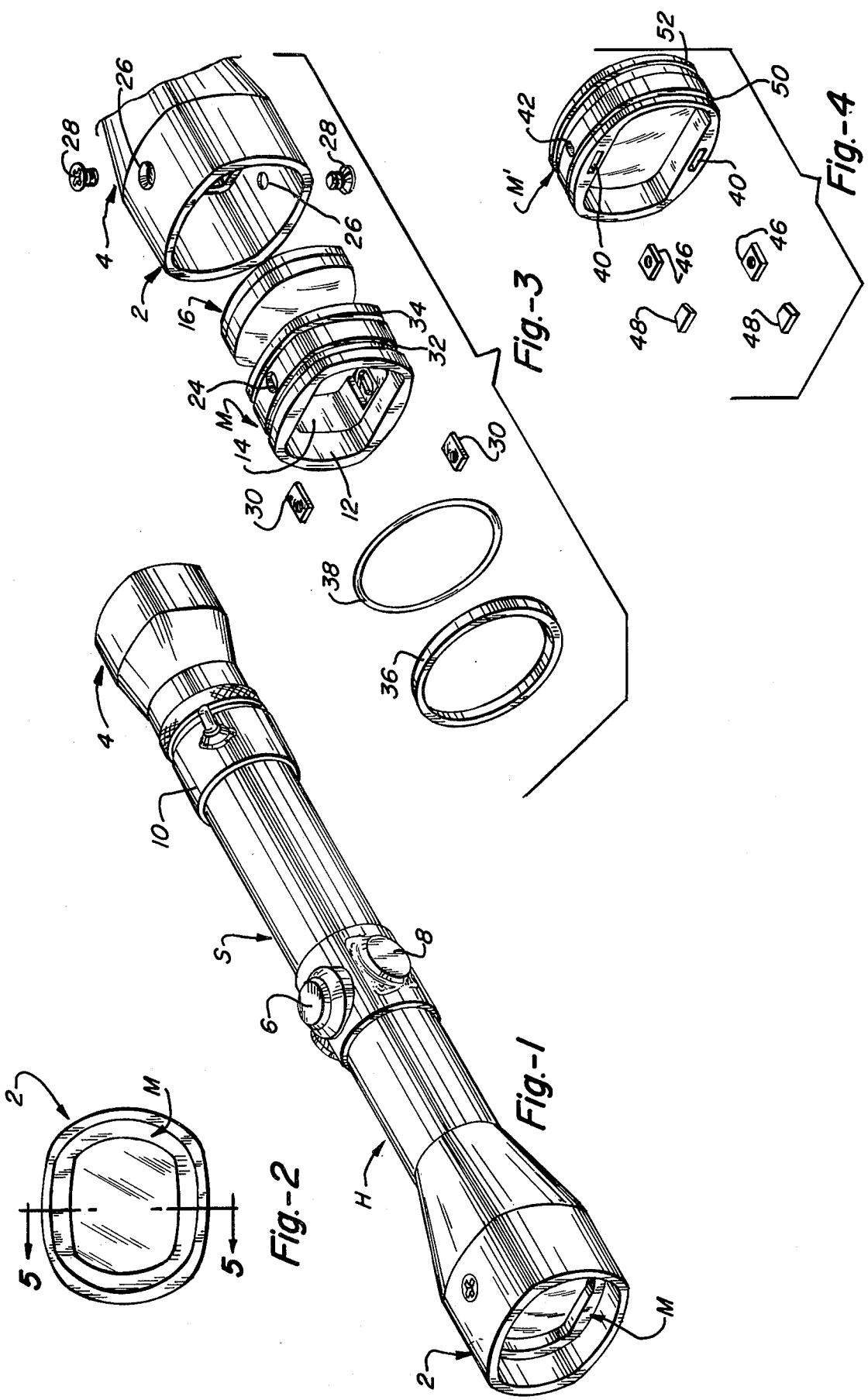

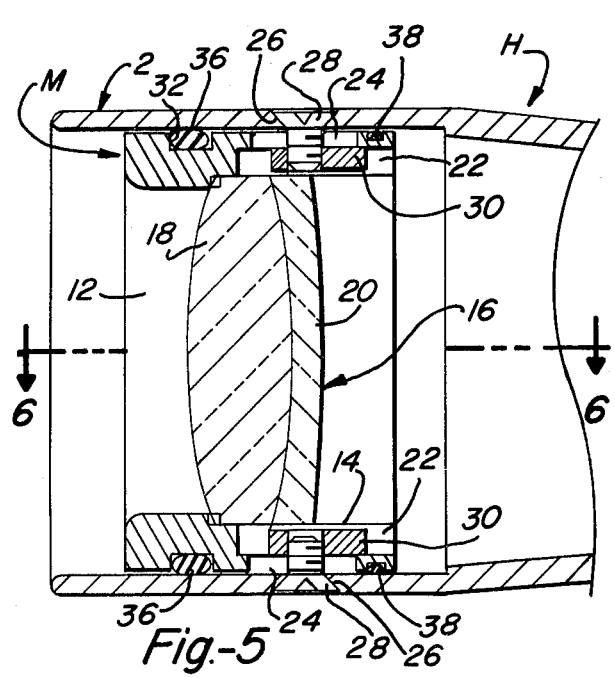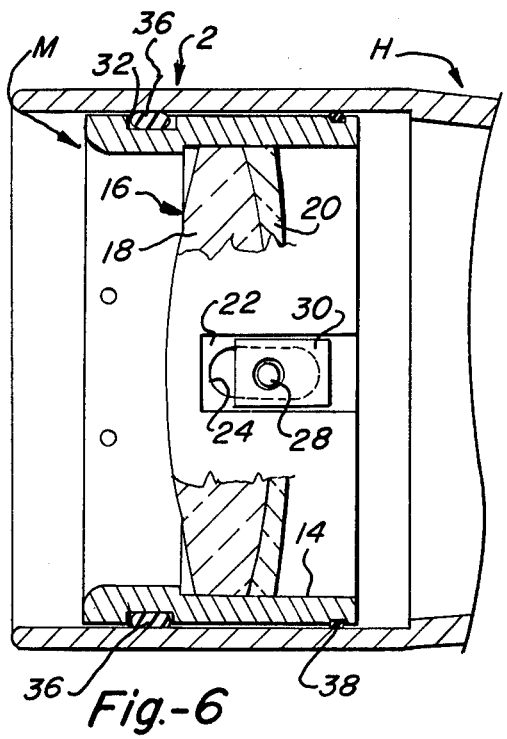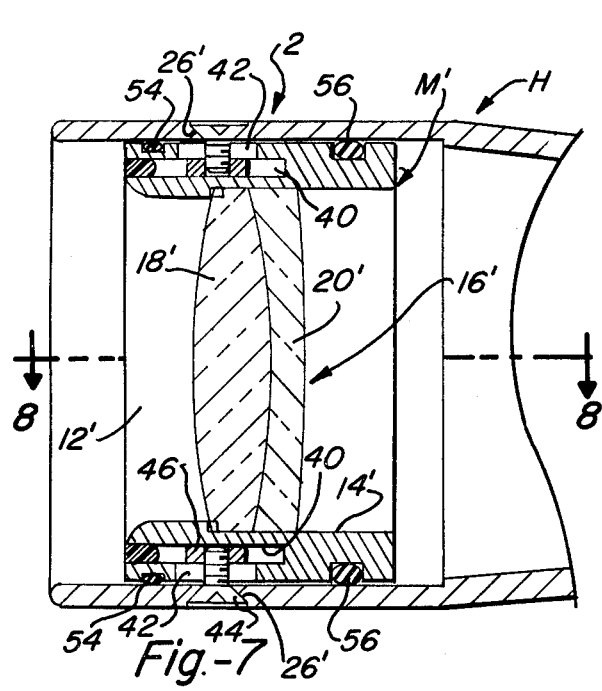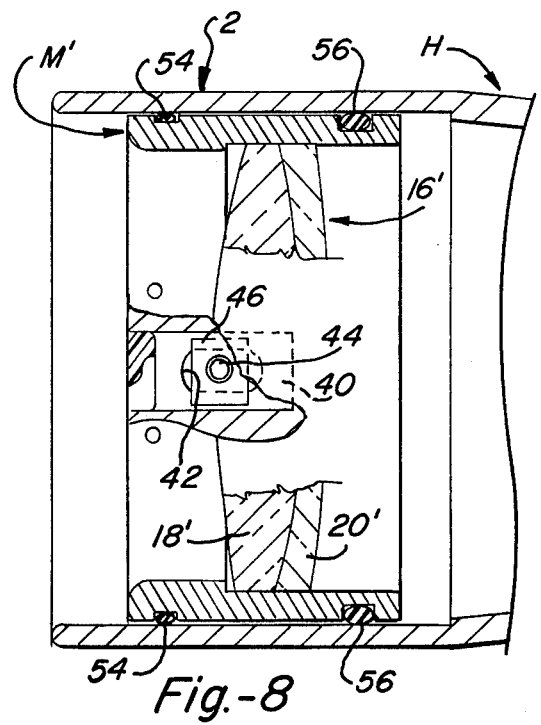

LINEAR OBJECTIVE ADJUSTMENT DEVICE FOR RIFLE SCOPE COLLIMATION

BACKGROUND OF THE INVENTION

1. Field of the Invention

The invention relates to an objective adjustment for rifle scope collimation and more particularly to a linear adjustment for use with scopes having a non-circular objective end.

2. Description of the Prior Art

In conventional rifle scopes, the adjustment of the objective lens system for collimation is accomplished by providing threads on the inside of the outer housing of the scope at the outer end thereof which receive corresponding threads on the outer surface of a lens mount containing the objective lens. To adjust the back focal position of the objective lens system to coincide with the focal point of the remaining lens systems, the lens mount together with the objective lens system is rotated whereby the pitch of the threads causes the objective lens system and the mount to move forwardly or rearwardly of the outer housing until the appropriate position is reached.

Obviously such an adjustment system is of no use for scopes in which the objective end is not circular because rotational movement is impossible. Furthermore, even with a circular objective lens there are certain disadvantages. If the mechanical axis of the lens mount is not coincident with the optical axis of the rifle scope, the image moves in relation to the remaining system and the reticle position. Thus, after positioning the objective lens system, the reticle must be adjusted to the optical center of the scope.

SUMMARY OF THE INVENTION

In accordance with this invention, a linear objective adjustment device for rifle scope collimation is provided which has an outer housing having a forward open end to receive an objective lens system. This lens system is carried in a lens mount mounted for longitudinal sliding movement within the housing at the open end thereof and is provided with locking means for adjustably positioning the lens mount in fixed position within the end of the housing.

More particularly, the linear objective adjustment device of this invention has a recess in the lens mount and a longitudinal slot therein between the recess and the outer housing. A hole is provided in the side of the outer housing through which a screw extends for threaded engagement with a slip nut in the recess which can be drawn tight to hold the lens mount in adjusted position. Annular grooves are provided in the lens mount on opposite sides of the lens system for receiving O-Rings to provide a seal between the lens mount and the outer housing. In one embodiment, the recess is open to the interior of the mount and extends rearwardly of the lens system. In another embodiment the recess is spaced from the interior of the lens mount and extends forwardly of the lens system. In this latter embodiment, the recess terminates in a forward opening or hole which is closed by a plug.

The invention is of particular advantage for use with non-circular rifle scopes wherein the horizontal dimension of the outer housing, lens mount and lens system is greater than the vertical dimension. This configuration allows a lower mechanical mounting of the scope to the rifle which benefits the shooter by not having to raise his head significantly further above the stock of the rifle in order to site through the scope than would be required without the scope.

Additional advantages of the invention will become apparent from the description which follows, taken in conjunction with the accompanying drawings.

BRIEF DESCRIPTION OF THE DRAWINGS

FIG. 1 is a perspective view of a rifle scope having the linear objective adjustment means of this invention;

FIG. 2 is a front elevation of the rifle scope of FIG. 1;

FIG. 3 is an exploded perspective view of one form of the linear objective adjustment means of this invention;

FIG. 4 is a perspective exploded view, similar to FIG. 3, but showing an alternative embodiment of the invention;

FIG. 5 is an enlarged vertical section, taken along line 5—5 of FIG. 2, showing details of the linear objective adjustment device in the FIG. 3 embodiment;

FIG. 6 is a horizontal fragmentary section, taken along line 6—6 of FIG. 5, showing further details of the linear objective adjustment device of FIG. 3;

FIG. 7 is a fragmentary vertical section, similar to FIG. 5, but showing the alternative embodiment of FIG. 4; and FIG. 8 is a fragmentary horizontal section, taken along line 8—8 of FIG. 7, showing further details of the embodiment of FIG. 4.

DESCRIPTION OF THE PREFERRED EMBODIMENT

In accordance with this invention, the linear objective adjustment device may be provided on a rifle scope such as the popular style scope S, shown in FIG. 1. This scope includes an outer housing H provided with an oval ocular end 2 which has an oval configuration having a greater horizontal dimension than vertical dimension. The ocular end 4 is provided with a similar configuration which permits the scope to have a low profile and be mounted closer to the rifle barrel so that the shooter does not have to raise his head significantly further above the stock of the rifle in order to site through the scope than would be required if no scope were used at all. The scope is also provided with an elevation adjustment 6 and windage adjustment 8 and may have a variable power adjustment means 10, as shown.

The adjustment means includes a lens mount which has a figuration corresponding to that of objective end 2 of the rifle scope housing H and is longitudinally movable and adjustable therein. The mount is provided with an oval opening 12 forming the viewing area and having a recess 14 at the inner end for receiving lens system 16 which is suitably cemented within recess 14. Conveniently, the lens system may comprise a forward convex lens 18 and a rear concave-convex lens 20.

Recess 14 is further provided with a pair of deeper recesses or guideways 22 at the top and bottom respectively of mount M, as best seen in FIG. 5, each of which has a slot 24 communicating with the exterior of the mount. Top and bottom holes 26 are provided in objective end 2 of housing H which align with slots 24 for receiving screws 28 which are threadably received in slip nuts 30. Thus, by loosening screws 28 slightly lens mount M can be slid forwardly or rearwardly until the back focal position of the lens system 16 can be made to coincide with the focal point of the remaining lens system (not shown) within the scope. When the lens mount has been properly located, screws 28 can be tightened drawing nuts 30 outwardly so as to clamp lens mount M against the inner surface of objective end 2. Advantageously, nuts 30 are longer on one end than the other to provide additional bearing surface.

Lens mount M is provided with a wide forward annular groove 32 and a narrow rear annular groove 34 for receiving a wide O-Ring 36 and a narrow O-Ring 38 which provide a tight seal when the lens mount is locked in place by screws 28 so that the interior of the scope may be filled with nitrogen gas under pressure to prevent moisture-laden air from entering the scope, as is well known in the art. These O-Rings are conveniently located forwardly and rearwardly of the lens system and of screws 28 so that when the screws 28 are tightened the pressure bearing on each O-Ring is substantially uniform.

An alternative embodiment is shown in FIGS. 4, 7 and 8 which includes a lens mount M' for slidably supporting a lens system 16' within objective end 2 of housing H. As in the previous embodiment, the lens system 16' may include a convex lens 18' and a concave-convex lens 20'. The lens mount includes an interior opening 12' forming the field of sight and having a recessed inner end 14' for receiving the lens system 16' as in the previous embodiment. Conveniently, the lens system can be cemented in place within the lens mount.

Lens mount M' includes an upper and lower guideway, or bore 40, of generally rectangular configuration, as shown. A longitudinal slot 42 communicates with this guideway and the exterior of the housing mount for receiving set screw 44 which is threadably received by slip nut 46 within guideway 40. After assembly, the ends of guideways, or bores, 40 are closed by means of plugs 48 which may be made of plastic or some other relatively soft material that can be force fitted into the ends of guideways 40. Conveniently, the set screws pass through holes 26', as best seen in FIG. 7, for clamping the lens mount once it has been moved to adjusted position against the interior surface of objective end 2 of housing H. Lens mount M' is provided with a forward narrow annular groove 50 and a wide rear annular groove 52 for receiving a narrow O-Ring 54 and a wide O-Ring 56, respectively.

From the foregoing, the advantages of this invention are readily apparent. A rifle scope has been provided having a non-circular objective end 2 wherein the objective end, the lens mount and the lens system are of oval configuration having a greater horizontal dimension than vertical dimension. A novel adjusting means is provided in such a rifle scope wherein the lens mount is mounted for longitudinal movement through the use of set screws and slip nuts arranged in guideways so as to firmly grip the lens mount against the interior surface of the objective end of the scope once adjustment has been achieved. This arrangement permits the mounting of the scope closer to the barrel of the rifle which allows a much more natural shooting position for the user wherein he is not required to raise his head above the stock of the rifle substantially more than he would if the rifle were not equipped with a scope.

The invention has been described in detail with particular reference to preferred embodiments thereof, but it will be understood that variations and modifications can be effected within the spirit and scope of the invention.

What is claimed is:
1. A linear objective adjustment device comprising:
   an outer housing having an open end to receive an objective lens system;
   a lens mount received within said open end of said housing and longitudinally slideable therein;
   an objective lens system mounted within said lens mount;
   means for adjustably locking said lens mount in fixed longitudinal position within the open end of said housing to adjust the back focal point of the objective lens system;
   said lens mount includes a guideway having a slot through said lens mount extending longitudinally thereof, and a hole in the side of said outer housing aligned with said slot, said locking means including:
   a slip nut in said guideway mounted for movement longitudinally along said slot; and a screw extending through said hole and threadably received in said slip nut to adjustably hold said lens mount in the fixed position in said open end of said outer housing.

2. A linear objective adjustment device, as claimed in claim 1, further including:
   a pair of annular grooves in the outer surface of said lens mount, one of said grooves being located on one side of said lens system and the other of said grooves being located on the other side of said lens system; and
   an O-Ring in each of said grooves contacting the inner surface of said outer housing in sealing relationship.

3. A linear objective adjustment means, as claimed in claim 1, wherein:
   said guideway is open to the interior of said lens mount.

4. A linear objective adjustment device, as claimed in claim 1, wherein:
   said guideway extends beyond one side of said lens system.

5. A linear objective adjustment device, as claimed in claim 1, wherein:
   said guideway is spaced from the interior of said lens mount.

6. A linear objective adjustment device, as claimed in claim 1, wherein:
   said guideway extends beyond one side of said lens system and terminates in a hole at the edge of said lens mount; and
   a plug is mounted in said hole in the lens mount to conceal said guideway.

7. A linear objective device, as claimed in claim 1, wherein:
   the outer housing, lens mount and lens system are of oval configuration having a greater dimension in one axis than in the other.

8. A linear objective adjustment device comprising:
   an outer housing having an open end to receive an objective lens system and having a hole in the side thereof;
   a lens mount received within said open end of said housing and longitudinally slidable therein, said lens mount including a guideway having a slot through said lens mount extending longitudinally thereof;
   an objective lens system mounted within said lens mount;

said outer housing, lens mount and lens system having an oval configuration of a greater dimension in one axis than in the other;

a slip nut in said guideway mounted for movement longitudinally along said slot;

a screw extending through said hole and threadably received in said slip nut to adjustably hold said lens mount in fixed position in said open end of said outer housing;

a pair of annular grooves in the outer surface of said lens mount, one of said grooves being located on one side of said lens system and the other said grooves being located on the other side of said lens system; and an O-ring in each of said grooves contacting the inner surface of said outer housing in sealing relationship.

* * * * *

UNITED STATES PATENT AND TRADEMARK OFFICE
CERTIFICATE OF CORRECTION

PATENT NO. : 4,090,780
DATED : May 23, 1978
INVENTOR(S) : Larry D. Davis

It is certified that error appears in the above–identified patent and that said Letters Patent are hereby corrected as shown below:

ASSIGNEE: OUTDOOR SPORTS INDUSTRIES, INC.

Signed and Sealed this

Seventeenth Day of October 1978

[SEAL]

Attest:

RUTH C. MASON
*Attesting Officer*

DONALD W. BANNER
*Commissioner of Patents and Trademarks*